Oct. 31, 1961  P. SIEGEL  3,006,610
STEAM AND HOT WATER HEATING DEVICE FOR CALENDER ROLLERS
Filed Aug. 21, 1959  3 Sheets-Sheet 2
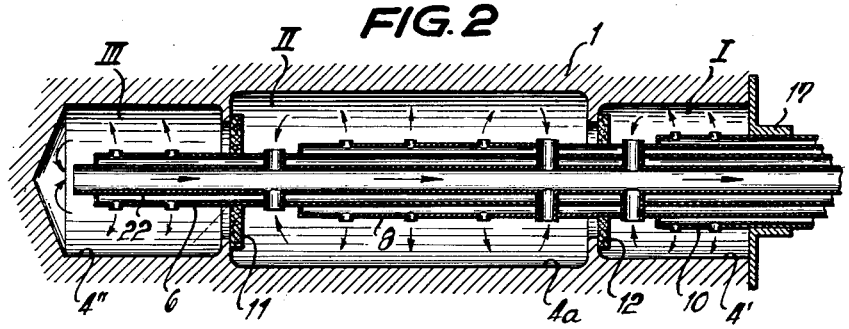
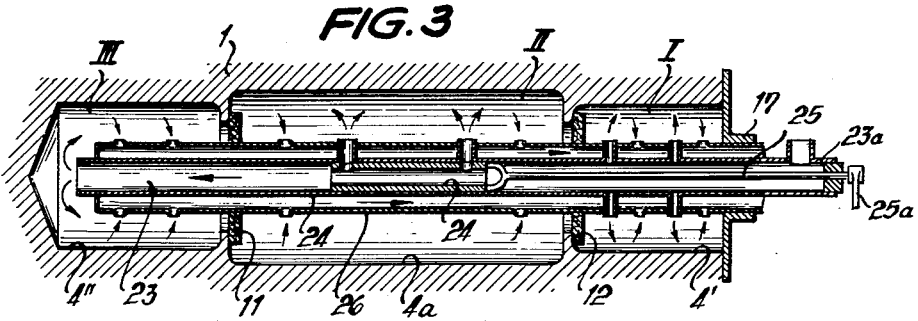
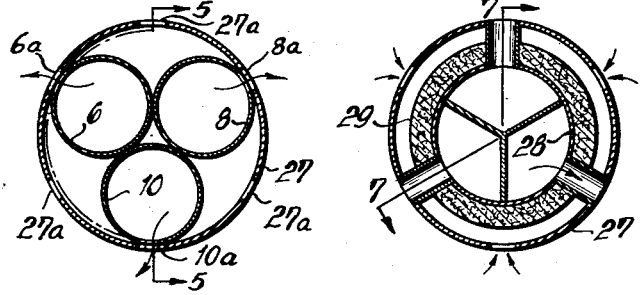
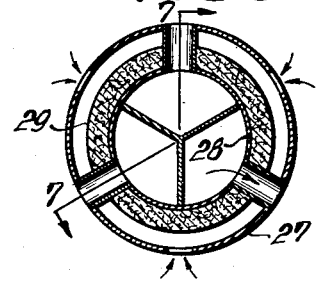
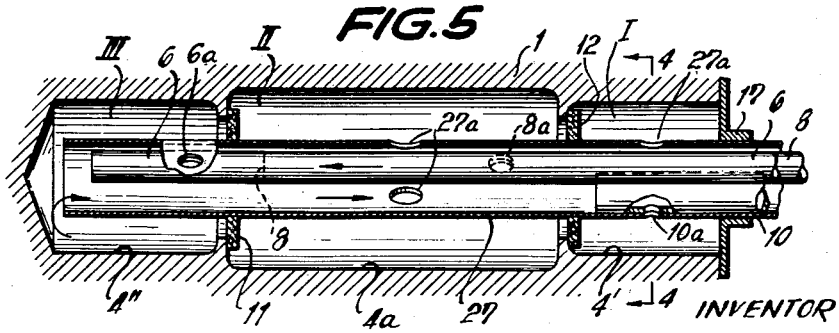
INVENTOR
Peter SIEGEL Oct. 31, 1961 P. SIEGEL 3,006,610
STEAM AND HOT WATER HEATING DEVICE FOR CALENDER ROLLERS
Filed Aug. 21, 1959 3 Sheets-Sheet 3

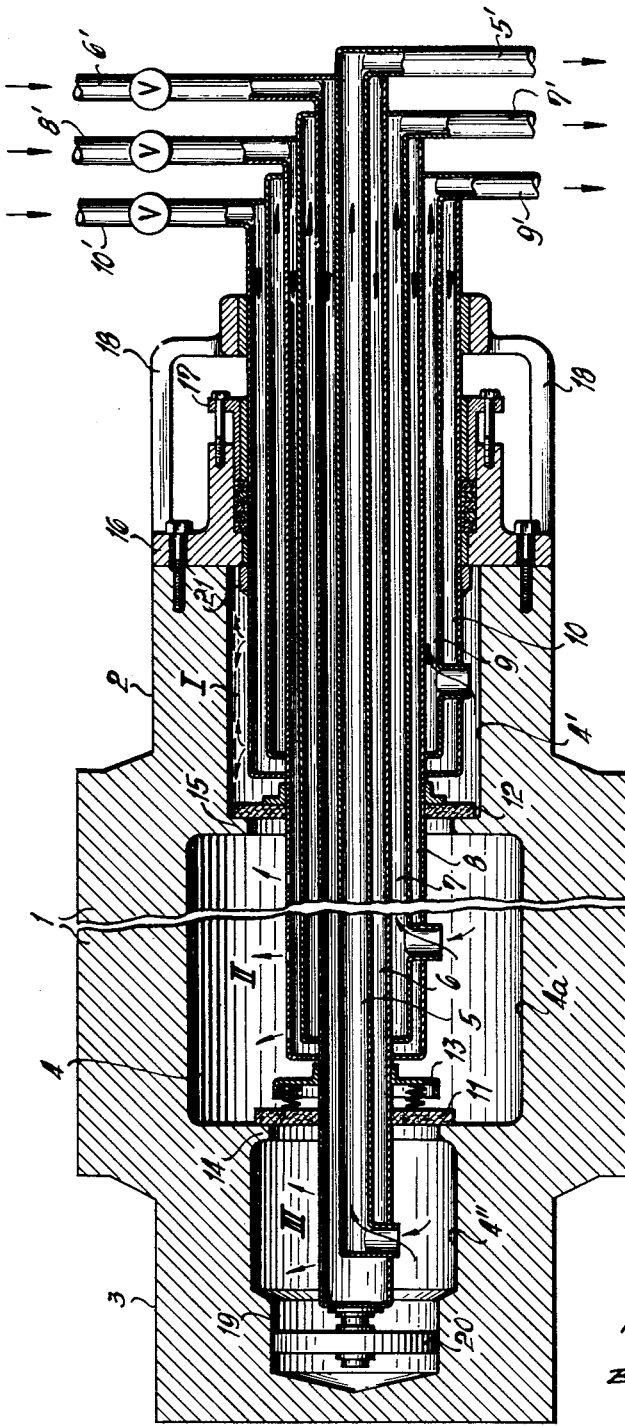

INVENTOR.
Peter SIEGEL
BY
Patent Agent

United States Patent Office 3,006,610
Patented Oct. 31, 1961

3,006,610
STEAM AND HOT WATER HEATING DEVICE FOR CALENDER ROLLERS
Peter Siegel, Krefeld, Germany, assignor to Joh. Kleinewefers Söhne, Krefeld, Germany
Filed Aug. 21, 1959, Ser. No. 835,240
Claims priority, application Germany Sept. 4, 1958
14 Claims. (Cl. 257—95)

The present invention relates to a steam or hot water heating device for calender rollers.

It is a well-known fact that the heating of calender rollers by means of steam or hot water causes difficulties insofar as it is impossible by means of the heretofore known devices so to distribute the heat in the interior of the roller that an even roller surface temperature will be obtained at the central as well as the end portions of the roller working surface. Due to the increased heat conduction into the bearings and the stands, and the greater heat conduction into the air, the ends of the working surface of the roller cool off to a considerably greater extent than the central portion of the roller so that the temperatures at these points will always be lower than at said central portion.

It is, therefore, an object of the present invention to provide heating means for calender rollers which will overcome the above mentioned drawback.

It is another object of this invention to provide a heating arrangement for calender rollers which will make it possible to produce and maintain a substantially even temperature over the entire working surface of the roller.

It is also an object of this invention to provide a heating device of the type set forth above which is relatively simple in construction and operation.

These and other objects and advantages of the invention will appear more clearly from the following specification in connection with the accompanying drawings, in which:

FIG. 1 is a diagrammatic cross section through a calender roller made of chilled iron and provided with three heating chambers arranged in the bore of the calender, also the feeding member for the heating medium being shown in section. For purposes of illustration, the roller has been shown considerably reduced in length. The heating insert consists of six coaxially arranged tubes.

FIG. 2 diagrammatically illustrates a heating bore subdivided into three chambers, a single central return pipe being provided for the return flow from all three chambers.

FIG. 3 diagrammatically illustrates a section through a three-chamber bore with a feeding pipe common thereto and a return pipe common to all three chambers, the feeding of the heating medium in the intermediate chamber being controlled by a valve.

FIG. 4 diagrammatically illustrates a cross section through a heating insert with three feeding pipes arranged alongside each other and an outer return pipe common thereto.

FIG. 5 is a sectional view of the heating system shown in FIG. 4 as indicated by line 5—5 thereon with the return pipe in section and the feeding pipes in elevation.

FIG. 6 is a diagrammatic cross section through another modification, in which the feeding pipes are heat insulated relative to the return pipe.

*General arrangement*

Figure 7:
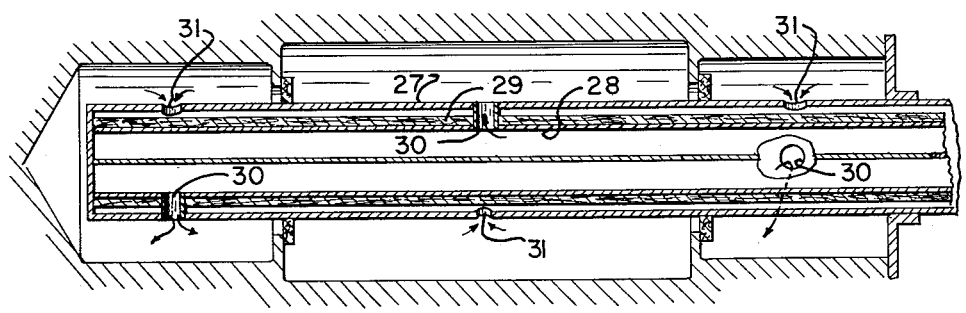
FIGURE 7 is a longitudinal sectional view indicated by line 7—7 on FIG. 6.

The present invention is characterized primarily in that the heating insert for feeding the heating medium is provided with discs which rest against correspondingly arranged constrictions in the roller bore and thereby subdivide the roller bore into two or more separate heating chambers. Each of said heating chambers has a heat feeding pipe of its own. Such an arrangement makes it possible increasingly to heat certain heating chambers for instance the two heating chambers below the ends of the working surface of the calender, whereas the heating chamber arranged in the central portion of the calender will be heated to a less degree. In this way, it is possible to obtain a straight temperature curve over the length of the working surface of the calender. However, with this arrangement, it is also possible to provide separate return pipes for each heating chamber. According to another embodiment of the invention, one return pipe common to all heating chambers may be selected. The feeding pipes may selectively be arranged coaxially with regard to each other or they may also be arranged alongside each other in an outer guiding pipe.

*Structural arrangement*

Referring now to the drawings in detail, FIG. 1 shows a section through a calender roller 1 provided at both ends thereof with bearing studs 2 and 3. The stepped bore generally designated 4 comprises bore 4a and bores 4′ and 4″ in the roller studs, said bores 4′ and 4″ having a diameter less than bore 4a. At those points where the bore 4a merges with the smaller bores 4′ and 4″, constrictions 14 and 15 are provided, said constriction 15 having a free cross section greater than that of constriction 14. The heating insert, consisting of six coaxially arranged pipes 5, 6, 7, 8, 9 and 10, has the outer pipe 10 journalled in a stuffing box 17 of flange 16. For supporting this bearing system and absorbing the weight, the said flange 16 is provided with a bridge 18 with a friction bearing. The individual feeding and discharge pipes for the heating medium are so arranged that the two inner pipes end at the outermost heating chamber III, the next two inner pipes end in the intermediate chamber II, whereas the two outer pipes end in the heating chamber I on the side of introduction of the heat into the roller. The individual heating chambers are sealed relative to each other, in conformity with a further development of the invention, by sealing discs 11 and 12 which are fixedly connected to the heating insert. The sealing disc 11 is somewhat less in diameter than that of the sealing disc 12 located at the feeding end, so that when inserting the heating insert, the sealing disc 11 will just pass through the constriction 15 and will seal there by engagement with the constriction 14. It is advantageous to make the sealing discs of carbon which, due to the inaccuracies inherent to the production, will grind themselves to a proper fit at the seating surfaces at the constrictions 14 and 15. In order to be able to equalize the different heat expansions when heating the heating insert and the roller, it is further advantageous to design one or also two sealing discs so that they will spring in axial direction as indicated at 13.

The arrangement of the discharge openings of the feeding pipes 6, 8 and 10 as well as of the return pipes 5, 7 and 9, is clearly indicated by arrows in the drawings. Similarly, the arrangement of the feeding pipes 6', 8' and 10' outside the roller with their control valves and discharge openings 5', 7' and 9' of the return pipes will be evident from the drawings. An axial disc 21 absorbs the axial stroke of the heating insert toward the outside.

The sealing effect of the discs 11 and 12 does not have to be absolute because all three chambers are under the same pressure. Also a different regulation of the feed in the feeding pipes will not materially change the situation because the three chambers possess the same pressure in view of the return pipe. At the outer end of the heating bore 4", there is arranged a reduced guiding bore 19 in which operates a supporting roller 20 connected to the heating insert, said supporting roller 20 cushioning the weight proper at the end of the heating insert.

In addition to the above mentioned arrangement of the sealing surfaces, another embodiment is possible according to which the sealing discs 11 and 12 are not engaging the marginal portions of the constrictions but are mounted with slight play within the constrictions.

FIG. 2 shows a heating insert for a three-chamber bore, which heating insert is for each chamber provided with a separate feeding pipe but has a return pipe 22 common to all three chambers.

FIG. 3 illustrates a heating insert likewise intended for a three-chamber bore but differing from FIG. 2 in that the heating insert is provided with a common feeding pipe 23 on the inside and a common return pipe 26 on the outside. With this type of embodiment of the heating insert all three chambers cannot be acted upon individually, i.e. differently, but the two outer chambers I and III will be controlled in unison, whereas the control of the intermediate chamber II is effected by arranging a valve spool 24 in the common feeding pipe 23. The valve spool 24 may be adjusted from the outside through the intervention of a rod 25 in such a way that the output openings of the feeding pipe in the intermediate chamber may be covered up to a variable extent. The adjustment of the spool may be effected either by an axial displacement or better by a radial turning movement of the outer adjusting lever 25a.

The said liquid is supplied to feeding pipe 23 by a conduit 23a opening from the side thereof.

FIG. 4 shows a section through a heating insert with an outer guiding pipe 27 which serves as common return pipe for all three heating chambers. The individual feeding pipes 6, 8, and 10 for each heating chamber are not coaxially arranged but are arranged alongside each other in a triangular arrangement within the outer return pipe and lead to the individual heating chambers as shown in side view in FIG. 5.

Communication is had between the heat chambers and the return pipe by way of the open end of the return pipe with reference to the end chamber, and by way of the ports 27a in the return pipe with reference to the others of the chambers. Communication between the feeding pipe and the chambers is by way of the ports 6a, 8a, and 10a, respectively which open from the feeding pipe through the return pipe into the respective chambers.

Inasmuch as the feeding and return pipes do not contact each other, it is advantageous, as far as it is permissible by the separate structure design to heat insulate said feeding and return pipes with regard to each other. Such insulation is particularly simple with such heating inserts which have a common return pipe.

According to a further embodiment of the invention as illustrated in FIG. 6, feeding pipes in the form of segments are composed to a round pipe 28 which latter is provided with an insulating layer 29 for insulation with regard to the concentric return pipe 27. This construction yields a relatively small cross section for the heating insert.

FIG. 7 will show that the individual segments of the composite feed pipe 28 communicate with the various chambers by the conduits 30 while the return pipe 27 is provided with ports 31 for the fluid leaving the chamber.

Figure 8:
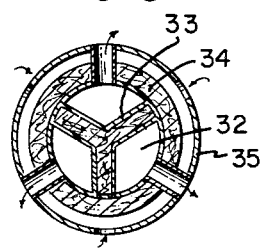
FIGURE 8 is a cross sectional view showing a somewhat modified arrangement in which the feeding pipes are heat insulated relative to each other and also relative to the return pipe.

FIG. 8 shows an arrangement similar to what is illustrated in FIGS. 6 and 7 except that the individual sections 32 of the segmented central feed pipe are separated by insulation 33 while insulation 34 separates the segments of the feed pipe from the return pipe 35.

Figure 10:
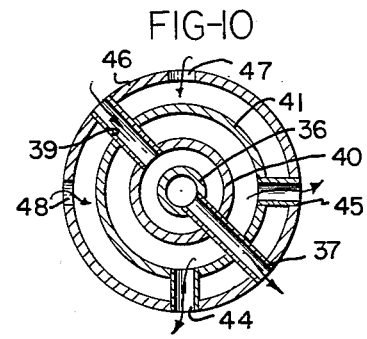
FIGURE 10 is a sectional view indicated by line 10—10 on FIGURE 9.
Figure 9:
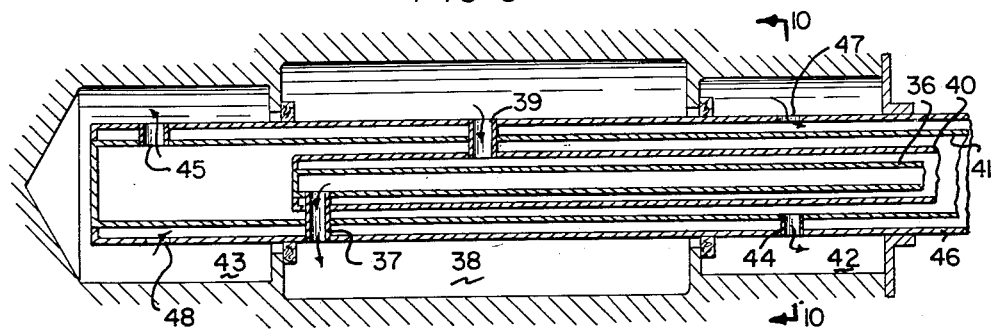
FIGURE 9 is a longitudinal sectional view showing still another modified arrangement in which the end chambers are supplied by one feed pipe and the other center chamber is supplied by another feed pipe, and with there being one return pipe for the center chamber, and another for the end chambers.

FIGS. 9 and 10 show an arrangement wherein a first feed pipe 36 is connected by conduit 37 with center chamber 38 of the roll while a conduit 39 connects this chamber with a return pipe 40.

A second feed pipe 41 is connected with the end chambers 42 and 43 by conduits 44 and 45 respectively while a second return pipe 46 is connected with the end chambers by apertures 47 and 48, respectively. The arrangement of FIG. 9, similarly to the arrangement of FIG. 3, provides for control of the center chamber independently of the end chambers.

It is, of course, to be understood that the present invention is, by no means, limited to the particular constructions shown in the drawings but also comprises any modifications within the scope of the appended claims.

What I claim is:

1. In combination for use in connection with calenders and the like: a roller provided with an axial bore sub-divided into a plurality of bore sections, conduit means mounted in said bore and extending thereinto from the outside of said roller for conveying heating fluid into and discharging fluid from said bore, and sealing means surrounding said conduit means and sealing at least some of said bore sections with regard to each other, said conduit means including means for individually and independently conveying heating fluid to and discharging fluid from at least some of said bore sections.

2. An arrangement according to claim 1, in which said axial bore is sub-divided into a plurality of bore sections by contractions of said bore.

3. In combination for use in connection with calenders and the like: a roller provided with an axial stepped bore, the steps of said bore being formed by shoulder means of said roller, a heating insert mounted in said stepped bore and extending thereinto from the outside of said roller for conveying heating fluid into and discharging fluid from said stepped bore, and sealing disc means surrounding said heating insert and sealingly engaging said shoulder means to thereby sub-divide said stepped bores into a plurality of chambers, said heating insert comprising a plurality of conduit means for conveying said fluid, at least some of said conduit means respectively communicating with a single but different chamber only.

4. In combination for use in connection with calenders and the like: a roller provided with an axial bore sub-divided into a plurality of bore sections to be heated individually, a heating insert mounted in said bore and extending thereinto from the outside of said roller for conveying heating fluid into and discharging fluid from said bore, and sealing means extending around portions of said heating insert and sealing individually to be heated bore sections with regard to each other, said heating insert comprising a plurality of coaxially arranged first conduit means respectively communicating with one only but a different one of the bore sections to be heated individually for feeding heating fluid into the respective bore sections to be heated individually, said heating insert also comprising a plurality of coaxially arranged second conduit means respectively communicating with one but a different one of the bore sections to be heated individually for discharging fluid therefrom.

5. An arrangement according to claim 4, which includes a stuffing box surrounding the outermost one of said conduit means and sealing said bore with regard to the atmosphere.

6. In combination for use in connection with calenders and the like: a roller provided with an axial stepped bore, the steps of said bore being formed by shoulder means of said roller, a heating insert mounted in said stepped bore and extending thereinto from the outside of said roller for conveying heating fluid into and discharging fluid from said stepped bore, and sealing disc means surrounding said heating insert and sealingly engaging said shoulder means to thereby sub-divide said stepped bores into a plurality of chambers, resilient means acting upon at least one of said sealing disc means for resiliently pressing the latter into sealing engagement with the respective adjacent shoulder means, said heating insert comprising a plurality of conduit means for conveying said fluid, at least some of said conduit means respectively communicating with a single but different chamber only.

7. An arrangement according to claim 3, in which said sealing disc means consist of pressed carbon.

8. In combination for use in connection with calenders and the like: a roller provided with an axial bore subdivided into a plurality of bore sections to be heated individually, a heating insert mounted in said bore and extending thereinto from the outside of said roller for conveying heating fluid into and discharging fluid from said bore, and sealing means extending around portions of said heating insert and sealing individually to be heated bore sections with regard to each other, said heating insert including a plurality of coaxially arranged heating fluid supply conduit means respectively communicating with one only but a different one of the bore sections to be heated individually for feeding a heating fluid into the respective bore sections to be heated individually, said heating insert also including discharge conduit means communicating with and common to all of said bore sections to be heated individually for discharging fluid therefrom.

9. In combination for use in connection with calenders and the like: a roller provided with an axial bore subdivided into at least three bore sections, heating insert means mounted in said bore and extending thereinto from the outside of said roller for conveying heating fluid into and discharging fluid from said bore, and sealing means respectively surrounding portions of said heating insert means and sealing the bore sections at the ends of said bore with regard to the bore section therebetween, said heating insert means including first feeding conduit means common to and communicating with the two bore sections at the ends of said bore for feeding heating fluid thereinto, said heating insert means also including first discharge conduit means common to and communicating with said last mentioned two bore sections for discharging fluid therefrom, said heating insert means additionally including second feeding conduit means and second discharge conduit means communicating with that bore section only which is located between said two bore sections at the ends of said bore.

10. In combination for use in connection with calenders and the like: a roller provided with an axial bore subdivided into two end sections and an intermediate section, first conduit means extending into said bore from the outside thereof and in continuous communication with said end sections for feeding heating fluid into said end sections, passage means leading from said first conduit means to said intermediate section, valve means arranged at said passage means and operable from the outside of said roller for selectively controlling the communication between said first conduit means and said intermediate section, and second conduit means extending from the outside into said bore and in continuous communication with all of said sections for discharging fluid therefrom.

11. In combination for use in connection with calenders and the like: a roller provided with an axial bore subdivided into two end sections and an intermediate section, first conduit means extending into said bore from the outside thereof and in continuous communication with said intermediate section, passage means respectively leading from said first conduit means to said end sections, valve means arranged adjacent said passage means and operable selectively from the outside of said roller for controlling communication between said first conduit means and said intermediate section, and second conduit means extending from the outside into said bore and in continuous communication with all of said sections for discharging fluid therefrom.

12. In combination for use in connection with calenders and the like: a roller provided with an axial bore subdivided into a plurality of bore sections, conduit means mounted in said bore and extending thereinto from the outside of said roller for conveying heating fluid into and discharging fluid from said bore, and sealing means surrounding said conduit means and sealing at least some of said bore sections with regard to each other, said conduit means including first tubular means for individually and independently conveying heating fluid to at least some of said bore sections, said conduit means also including second tubular means heat insulated from said first tubular means and communicating with said bore for discharging fluid therefrom.

13. An arrangement according to claim 12, which includes insulating means common to all of said first tubular means for insulating the same relative to said second tubular means.

14. An arrangement according to claim 12, which includes insulating means individually surrounding said first tubular means for insulating the same relative to said second tubular means.

References Cited in the file of this patent

UNITED STATES PATENTS

| 2,603,457 | Bishop | July 15, 1952 |
| 2,780,443 | Holloway | Feb. 5, 1957 |
| 2,793,006 | Eaby | May 21, 1957 |

FOREIGN PATENTS

| 251,989 | Switzerland | Sept. 1, 1948 |
| 399,252 | Great Britain | Oct. 5, 1933 |